Figure 1:
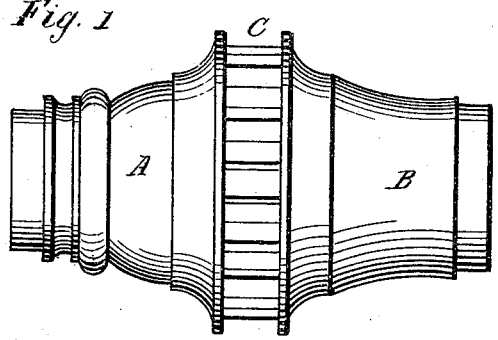
Figure 2:
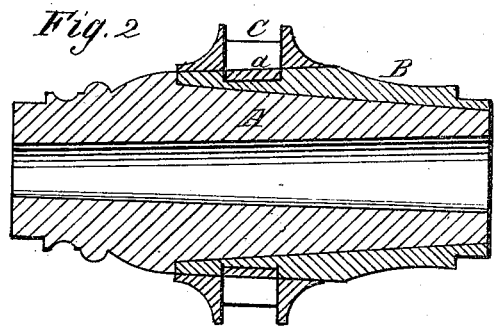
Figure 3:
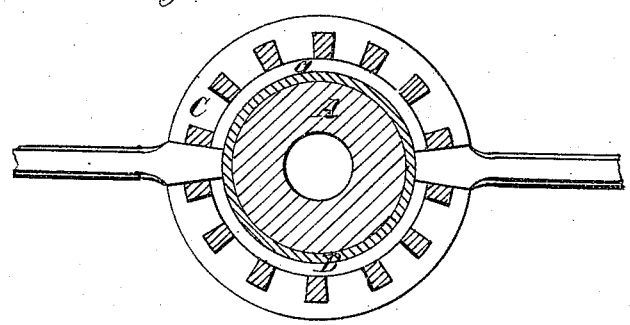

J. B. HUBBELL.

Improvement in Hubs for Vehicle-Wheels.

No. 129,666. Patented July 23, 1872.

Witnesses
Hart C. Hubbell
John W. Webster

Inventor
Jerome B. Hubbell
per L. Holmes, his Atty

UNITED STATES PATENT OFFICE.

JEROME B. HUBBELL, OF NAUGATUCK, CONNECTICUT.

IMPROVEMENT IN HUBS FOR VEHICLE-WHEELS.

Specification forming part of Letters Patent No. 129,666, dated July 23, 1872.

I, JEROME B. HUBBELL, of Naugatuck, in the county of New Haven, in the State of Connecticut, have invented certain Improvements in Carriage-Wheel Hubs, of which the following is a specification:

My invention consists in a compound carriage or wagon wheel hub, so constructed and arranged in its several parts that the core, which is made of wood, may be withdrawn or renewed without the necessity of disturbing the wheel-spokes; also, in securing the core into a strong metallic sheath or shell, thus giving the sheath an extended bearing on the surface of the wooden core; also, in grooving, circumferentially, the surface of the sheath or shell for the purpose of receiving and supporting the tenons of the wheel-spokes; also, in giving the mortise or flanch ring a metallic support upon the outer surface of the sheath or shell, the mortise or flanch ring being fitted internally to correspond to the tapering outer surface of the sheath and driven tightly thereon; also, in locking the mortise or flanch ring and grooved sheath together by means of the ends of the spokes driven through the mortises into the circumferential groove in the surface of the metallic sheath.

Figure I is an outside longitudinal view of the hub; Fig. II, a longitudinal section; Fig. III, a cross-section near the center.

A is a conical wooden core, which is fitted in the center with the usual journal-box, the outer surface being turned to the proper taper to fit snugly into the metallic sheath B, into which it is tightly forced. The sheath B has a groove, a, upon its outer surface corresponding in position to the mortises or sockets in the flanch or mortise ring C, and into which groove the ends of the spokes are forced, thus locking the mortise-ring C and the sheath B permanently together. A portion of the outer surface of B is turned to a taper in the reverse direction of the surface of the core A, and the ring C, being bored to correspond thereto, is forced tightly onto the sheath B. The core A may be inserted after the wheel is otherwise completed, or it may be removed after insertion, or renewed at any time without disturbing the wheel-spokes or the parts constituting the hub.

I claim—

1. The combination of the wooden core A with the metallic sheath B with its groove a, substantially as and for the purpose hereinbefore shown and described.

2. The combination of the flanch or mortise ring C with the sheath B and core A, substantially as and for the purposes hereinbefore shown and described.

JEROME B. HUBBELL.

Witnesses:
HART C. HUBBELL,
JOHN W. WEBSTER.